United States Patent [19]

Sharp

[11] 4,137,598
[45] Feb. 6, 1979

[54] WINDSHIELD WIPER BLADE HOLDER HAVING ARTICULATED MOLDED YOKES

[75] Inventor: Bernard C. Sharp, White Plains, N.Y.

[73] Assignee: Parker-Hannifin Corporation, Shelton, Conn.

[21] Appl. No.: 816,261

[22] Filed: Jul. 18, 1977

[51] Int. Cl.² ............................................. B60S 1/40
[52] U.S. Cl. ................................................. 15/250.42
[58] Field of Search .......... 15/250.31, 250.32, 250.36, 15/250.42

[56] References Cited

U.S. PATENT DOCUMENTS

| 3,874,025 | 4/1975 | Cone | 15/250.42 |
| 3,877,106 | 4/1975 | Bauer et al. | 15/250.42 |
| 3,942,212 | 3/1976 | Steger et al. | 15/250.42 |
| 3,978,544 | 9/1976 | van den Berg et al. | 15/250.42 |
| 4,014,066 | 3/1977 | Harbison et al. | 15/250.42 |

FOREIGN PATENT DOCUMENTS 1809096  7/1970  Fed. Rep. of Germany ........ 15/250.42

Primary Examiner—Christopher K. Moore
Attorney, Agent, or Firm—Albert C. Johnston; Gerard F. Dunne

[57] ABSTRACT

In a windshield wiper blade holder comprising pressure distributing claw yokes articulated to the ends of a primary yoke adapted to be coupled with a wiper arm, each claw yoke is a molded plastic body having between its arms an upwardly open coupling and bearing structure that is snappable onto mating structure on an end of the primary yoke and provides a highly durable pivotal connection yet can be produced in a simple two-part mold. As a further feature, the inner arm of each claw yoke is constituted by an upwardly open channel that receives a fitting, substantially rigid beam structure of the primary yoke and nests progressively farther with it, up to the arm end, as the wiper is moved over more steeply curved windshield surfaces, thus increasing the lateral stability of the blade holder; and the outer claw arm is formed oppositely as a downwardly open channel, enabling claw yokes having the required rigidity to be provided with molded wall sections of relatively little thickness and weight.

7 Claims, 9 Drawing Figures

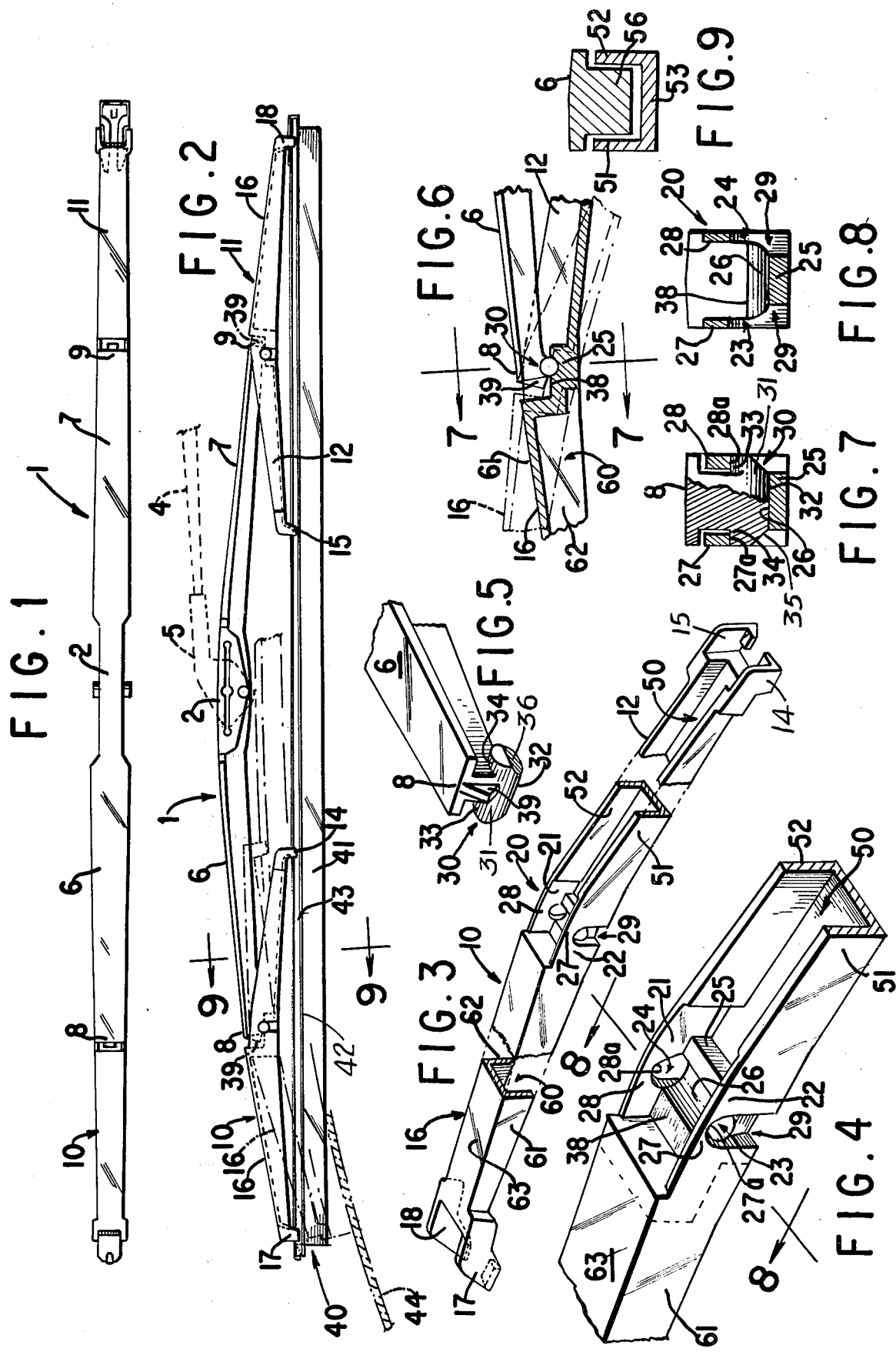

WINDSHIELD WIPER BLADE HOLDER HAVING ARTICULATED MOLDED YOKES

This invention relates to windshield wiper blade holders, and more particularly to a blade holder of the type comprising molded "secondary" yokes, or claw yokes, articulated to the ends of a primary yoke for distributing the pressure and wiping motions of a wiper area coupled with the primary yoke to a wiper blade unit held on the claws of the claw yokes.

Various forms of windshield wiper blade holders of the stated type are known. Examples of them may be seen in German DAS No. 1,090,122 and U.S. Pat. Nos. 3,877,106, 3,925,844, 3,935,612, 3,928,887 and 3,942,212. The known forms of such blade holders, however, have various shortcomings, in that the molding of the claw yokes is objectionably complex or the molded yokes are objectionably heavy, or the points articulating them to the primary yoke are insufficiently sturdy or are poorly suited for a wiper that is to be moved over steeply curved windshield surfaces, or is to be parked in a limited recess at the base of the windshield.

The object of the present invention is to provide windshield wiper blade holders of the type above mentioned, and molded claw yokes for such holders, by which the shortcomings above noted can be overcome.

According to one feature of this invention, a blade holder of the stated type is provided with claw yokes each of which is a molded plastic body presenting between inner and outer claw arms an upwardly open coupling and bearing structure that can be snapped onto a mating bearing member on an end of the primary yoke to provide a pivotal joint, yet can be produced economically in a simple two-part mold without need for side core pins to be pulled from the molding.

According to another feature of the invention, the inner arm of the molded plastic body constituting each claw yoke is formed as an upwardly open channel extending from a coupling structure between the yoke arms to the claws on the inner arm end, which channel receives a fitting, substantially rigid beam structure of the primary yoke and nests progressively farther with it, up to the arm end, as the inner arm end is pivoted farther toward the primary yoke. In this way, the blade holder is given increased lateral stability as the wiper is moved over relatively steeply curved windshield surfaces, and it will occupy only a limited space of protrusion from such surfaces.

Still further, the outer arm of each claw yoke is formed as a downwardly open channel extending to the claws on the outer arm end from wall portions of the molded plastic body at its coupling structure. By virtue of this downwardly channeled arm form together with the upwardly channeled form of the inner arm, each claw yoke can be given the required rigidity by molded wall sections of relatively little thickness and weight, thus enabling a lighter and less costly wiper blade assembly.

The foregoing and other objects, features and advantages of the invention will be further apparent from the following detailed description and the accompanying drawings of an illustrative embodiment of the invention. In the drawings:

FIG. 1 is a top plan view of a windshield wiper blade holder embodying the invention;

FIG. 2 is a side elevational view thereof;

FIG. 3 is an enlarged perspective view of one of the claw yokes;

FIG. 4 is a further enlarged perspective view of the coupling structure and adjacent portions of the channel arms of the claw yoke;

FIG. 5 is a perspective view of an end portion of the primary yoke;

FIG. 6 is a longitudinal cross-sectional view showing the claw yoke portions of FIG. 4 with a primary yoke end in coupled position;

FIG. 7 is an enlarged cross-sectional view taken along line 7—7 of FIG. 6;

FIG. 8 is a cross-sectional view taken along line 8—8 of FIg. 4; and

FIG. 9 is a cross-sectional view taken along line 9—9 of FIG. 2, showing a claw yoke arm in fully nested relation to part of the primary yoke.

The windshield wiper blade holder as shown in FIGS. 1 and 2 comprises a primary pressure distributing yoke 1 having a central portion 2 adapted to be coupled with a windshield wiper arm 4, for instance by an arm coupler 5 as disclosed more particularly in U.S. Pat. No. 3,928,887, with legs 6 and 7 extending oppositely from the central portion 2 to yoke ends 8 and 9 to which "secondary" pressure distributing yokes 10 and 11, herein referred to as claw yokes, are articulated by the coupling structures described more particularly below.

The claw yokes 10 and 11 are formed alike, as also are the legs and the coupling structures on the ends 8 and 9 of the primary yoke.

Each claw yoke, as exemplified by the yoke 10 shown in FIG. 3, is constituted by a molded plastic body comprising an inner arm 12 formed with claws 14 and 15 on its end and an outer arm 16 formed with claws 17 and 18 on its end. Each claw yoke comprises a between these arms a coupling structure indicated generally by numeral 20, which as shown in FIGS. 2, 6 and 7 is engaged pivotably onto a mating coupling structure 30 (FIG. 5) formed on the end 8 or 9 of the primary yoke 1.

The claws 14, 15 and 17, 18 on the ends of the claw yokes are formed and serve in known manner for holding a wiper blade unit, or blade refill, 40 and distributing to the blade unit the wiping pressure and wiping motions applied to the blade holder by the wiper arm 4. The blade unit 40, for example, is constituted by a rubber wiping blade 41 and an extruded plastic backing strip 42. The backing strip 42 is formed wth a downwardly slotted central hollow which holds a bulbous head portion of the rubber blade, and with a laterally open channel 42 along each of its sides to receive slidably the claws of the claw yokes 10 and 11 and to be pressed and moved by them so that the rubber wiping blade will work effectively over a surface region of a curved automobile windshield 44 (FIG. 2).

As shown in FIGS. 3, 4 and 8, the coupling structure 20 of each claw yoke comprises laterally spaced side walls 21 and 22 which extend upwardly at opposite sides of the molded plastic body and a base portion 25 which presents an upwardly concave bearing surface 26 between the side walls. The side walls 21 and 22 lie laterally outward of the bearing surface 26. They are formed with transverse openings 23 and 24 which are bordered at their respective upper sides by side wall portions 27 and 28 that present downwardly concave surfaces 27a and 28a. These surfaces are substantially coaxial with the upwardly concave bearing surface 26, so that they constitute with it a kind of bearing hub for being fitted onto and supporting pivotally on several surfaces a mating coupling and bearing structure 30 provided on an end of the primary yoke 1.

The mating coupling and bearing structure 30, as shown in FIG. 5, comprises at the under side of the primary yoke end 8 (or 9) a transverse bearing member 31 having a loaf-like form, which presents a downwardly convex surface 32 formed to seat pivotably on the concave bearing surface 26 of the claw yoke, and has laterally protruding ends 33 and 34 that constitute pivot posts formed to be seated in the side wall openings 23 and 24 on their respective concave bordering surfaces 27a and 28a.

When the bearing member 31 is fitted into and seated on the coupling and bearing structure 20 of the claw yoke, as seen in FIG. 7, the convex surface 32 of member 31 bears pivotably against the concave bearing surface 26 over substantially the full axial extent of these surfaces, and the convex upper surface portions of the pivot posts 33 and 34 bear similarly against the downwardly concave surfaces 27a and 28a of the side wall openings. A sturdy joint is thus obtained, which provides for proper articulation of each claw yoke on the primary yoke and will hold the claw yoke properly positioned over long periods of wiper service.

By virtue of the form of the structure at 20, including the location of its side walls 21 and 22 laterally outward of the bearing surface 26, the claw yokes can be molded in a simple two-part mold without need for removing any side coring elements before the molding is removable from the mold. The transverse openings can be provided at 23 and 24 by cored out regions of the side walls 21 and 22, which as shown at 29 in FIGS. 4 and 8 extend from the lower edges of these walls over the ends of the base portion 25 to the downwardly concave surfaces 27a and 28a at the top of the openings. Such cored out regions can be formed by fixed coring elements of a two-part mold.

The side wall portions 27 and 28 bordering the upper sides of the openings 23 and 24 are made sufficiently thin to be elastically resilient. The pivot posts 33 and 34 of the bearing member 30 are formed with lower end surfaces 35 and 36 which are tapered upwardly and outwardly from the bottom of the convex surface 32. These tapered surfaces are formed to fit in between the side wall portions 27 and 28 so that, upon being engaged with them and pressed downward, the tapered end surfaces will spring the side wall portions apart until the bearing member 30 becomes snapped into seated and working engagement with the concave surfaces 26, 27a and 28a. Thus, proper assembly of each claw yoke onto an end of the primary yoke end can be effected quickly by a simple rectlinear of one piece relative to the other.

As seen in FIGS. 3–5, the base portion 25 of the structure 20 of each claw yoke is formed with a shoulder 26. Each end of the primary yoke is formed with an outwardly protruding ledge 39 adjacent to the bearing member 30, which ledge normally lies in an inactive position as indicated by the full lines in FIG. 6. Upon upward movement of the outer arm 16 of the claw yoke to approximately a position as indicated by the broken lines in FIG. 6, the shoulder 38 butts against the ledge 39 to prevent further upward movement of the claw yoke arm 16 relative to the primary yoke. This limitation of the movement provides a safeguard against the arm being pivoted so far by abnormal manipulations, such as by being grasped at its end and lifted far away from a windshield, that the claws 17, 18 could distort or be forced out of the ends of the backing strip channels 43.

According to a further feature of the illustrated embodiment of the invention, the inner arm 12 of each claw yoke 10 or 11 has the form of an upwardly open channel 50 extending from the coupling and bearing structure 20 to the claws 14, 15 on the end of the inner arm. This channel is constituted by arm side walls 51 and 52 and a joining bottom wall 53, which are formed as extensions of the side walls 21 and 22 and base portion 25, respectively.

As may be seen in FIGS. 2, 5 and 9, the legs 6 and 7 of the primary yoke 1 have a form like an I-beam, with a substantially T-shaped cross section which presents a substantially rigid beam structure 56 of rectangular cross-section along the lower side of the primary yoke up to the bearing member 30 on its ends. The beam structure 56 fits in between the side walls 21 and 22 and into the channel 50 of each claw yoke. When a wiper fitted with the blade holder is on a substantially straight windshield surface, the beam structure 56 nests into the channel 50 over only a part of the length of the claw arm 12, as indicated by full lines in FIG. 2. Yet as the arm 12 is pivoted farther toward the primary yoke, the beam structure 56 becomes nested progressively farther into the channel 50, up to the point of fitting into it from end to end substantially as indicated in FIG. 9 and by broken lines in FIG. 2. In this way, the blade holder is given increased lateral stability as a wiper employing it is moved over relatively steeply curved windshield surfaces which cause the claws on the inner arm 12 to be positioned near or quite next to the primary yoke.

As may be seen in FIGS. 2–4 and 6, the outer arm 16 of each claw yoke has the form of a downwardly open channel 60 extending from walls of the molded plastic body at the coupling and bearing structure 20 to the claws 17, 18 on the outer arm end. This channel is constituted by arm side walls 61 and 62, which are outward extensions of the side walls 21 and 22, and a top wall 63 joining the walls 61 and 62. By virtue of the downwardly open channeled form of the outer arm 16 together with the upwardly open channeled form of the inner arm 12, each claw yoke can be given the rigidity required for assured serviceability of the blade holder, yet can be made with molded wall sections of relatively little thickness and weight. For instance, the walls 51–53 and 61–63 will give the claw yoke satisfactory sturdiness when molded from a suitable thermoplastic resin, for example a polycarbonate resin impregnated with carbon black, to thicknesses of 0.065" to 0.085".

The claw yokes are so formed that they can be produced quite economically in a simple molding operation utilizing a two-part mold without removable side core pins. The primary yoke can also be produced.

What is claimed is:

1. In a windshield wiper blade holder comprising a primary pressure distributing yoke having a central portion adapted to be coupled with a wiper arm and claw yokes articulated to the ends of the primary yoke, each claw yoke being a molded plastic body comprising inner and outer arms formed with claws on their ends for the holding and distributing pressure to a wiper blade unit and having between said arms a coupling and bearing structure engaged pivotably onto mating structure on an end of the primary yoke, the improvement wherein said coupling and bearing structure of each claw yoke comprises spaced side walls extending upwardly at opposite sides of said body and a base portion presenting an upwardly concave bearing surface between said side walls, said side walls lying laterally outward of said bearing surface and being formed with transverse openings therein, said openings being bordered at their respective upper sides by side wall portions presenting downwardly concave surfaces substantially coaxial with said bearing surface, said mating structure comprising a transverse bearing member presenting along its under side a convex surface seated on said bearing surface, said member extending laterally into and terminating in oppositely directed pivot posts which present along their upper sides convex surfaces seated in said openings on said downwardly concave surfaces.

2. A wiper blade holder according to claim 1, said openings being formed by cored out regions of said side walls, which regions extend upwardly from the lower edges of said side walls over the ends of said base portion to said downwardly concave surfaces.

3. A wiper blade holder according to claim 2, said side wall portions being elastically resilient, said pivot posts having tapered lower end surfaces which, upon being engaged with and pressed downward relative to said side wall portions, will spring the latter apart and thus snap said bearing member into engagement with said concave surfaces.

4. A wiper blade holder according to claim 1, the inner arm of said body being formed by inward extensions of said base and said side walls which constitute an upwardly open channel extending from said coupling and bearing structure to the claws on the inner arm end, said primary yoke having therealong a substantially T-shaped cross-section the head portion of which overlies said extensions of said side walls and the leg portion of which is a substantially rigid beam structure that is fitted into said channel and becomes nested into it progressively farther, thus increasing its lateral stability, as said inner arm is pivoted farther toward said primary yoke.

5. A wiper blade holder according to claim 4, the outer arm of said body being formed by outward extensions of said side walls with a top wall joining them to constitutee a downwardly open channel extending to the claws on the outer arm end, whereby the claw yoke is given required rigidity by molded wall sections of relatively little thickness and weight.

6. In a windshield wiper blade holder comprising a primary pressure distributing yoke having a central portion adapted to be coupled with a wiper arm and claw yokes articuated to the ends of the primary yoke, each claw yoke being a molded plastic body comprising inner and outer arms formed with claws on their ends for holding and distributing pressure to a wiper blade unit and having between said arms a coupling and bearing structure engaged pivotably onto mating structure on an end of the primary yoke, the improvement wherein the inner arm of said body is formed by a bottom wall and spaced side walls which constitute an upwardly open channel extending from said coupling and bearing structure to the claws on the inner arm end, said primary yoke having therealong a substantially T-shaped cross-section the head portion of which overlies said extensions of said side walls and the leg portion of which is a substantially rigid beam structure that is fitted into said channel and becomes nested into it progressively farther, thus increasing its lateral stability, as said inner arm is pivoted farther toward said primary yoke, the outer arm of said body being formed by outward extensions of said side walls with a top wall joining them to constitute a downwardly open channel extending to the claws on the outer arm end, whereby the claw yoke is given required rigidity by molded wall sections of relatively little thickness and weight.

7. In a windshield wiper blade holder comprising a primary pressure distributing yoke having a central portion adapted to be coupled with a wiper arm and claw yokes articulated to the ends of the primary yoke, each claw yoke being a molded plastic body comprising inner and outer arms formed with claws on their ends for holding and distributing pressure to a wiper blade unit and having between said arms a coupling and bearing structure engaged pivotably onto mating structure on an end of the primary yoke, the improvement wherein said coupling and bearing structure of each claw yoke comprises spaced side walls extending upwardly at opposite sides of said body and a base portion presenting an upwardly concave bearing surface between said side walls, said side walls lying laterally outward of said bearing surface and being formed with transverse openings therein, said openings being bordered at their respective upper sides by side wall portions presenting downwardly concave surfaces substantially coaxial with said bearing surface, said mating structure comprising a transverse bearing member presenting along its under side a convex surface seated on said bearing surface, said member extending laterally into and terminating in oppositely directed pivot posts which present along their upper sides convex surfaces seated in said openings on said downwardly concave surfaces, said openings being formed by cored out regions of said side walls, which regions extend from the lower edges of said side walls over the ends of said base portion to said downwardly concave surfaces, said side wall portions being elastically resilient, said pivot posts having tapered lower end surfaces which, upon being engaged with and pressed downward relative to said wall portions, will spring the latter apart and thus snap said bearing member into engagement with said concave surfaces, the inner arm of said body being formed by inward extensions of said base and said side walls which constitute an upwardly open channel extending from said coupling and bearing structure to the claws on the inner arm end, said primary yoke having therealong a substantially T-shaped cross-section the head portion of which overlies said extensions of said side walls and and the leg portion of which is a substantially rigid beam structure that is fitted into said channel and becomes nested into it progressively farther, thus increasing its lateral stability, as said inner arm is pivoted farther toward said primary yoke, the outer arm of said body being formed by outward extensions of said side walls with a top wall joining them to constitute a downwardly open channel extending to the claws on the outer arm end, whereby the claw yoke is given required rigidity by molded wall sections of relatively little thickness and weight.

* * * * *